United States Patent [19]

Okamoto et al.

[11] Patent Number: 4,998,194
[45] Date of Patent: Mar. 5, 1991

[54] MULTIPLEX CONTROL SYSTEM WITH PROGRAMMABLE LOGIC FOR CONTROLLING SIGNAL TRANSFER BETWEEN CONTROLLERS AND ONE OR MORE CONTROLLED SYSTEMS

[75] Inventors: Tadashi Okamoto; Noboru Azusawa, both of Ibaraki, Japan

[73] Assignee: Hitachi, Ltd., Tokyo, Japan

[21] Appl. No.: 329,514

[22] Filed: Mar. 28, 1989

[30] Foreign Application Priority Data

Mar. 28, 1988 [JP] Japan ................................ 63-74149

[51] Int. Cl.$^5$ .......................... G05B 9/03; G06F 11/16
[52] U.S. Cl. .................................... 364/133; 364/136; 364/187; 371/9.1; 371/36
[58] Field of Search ........................... 364/131–136, 364/184–187, 138, 139, 200 MS File, 900 MS File, 140, 141; 371/9.1, 11.1, 11.3, 36

[56] References Cited

U.S. PATENT DOCUMENTS

| | | | |
|---|---|---|---|
| 4,377,000 | 3/1983 | Staab | 364/187 X |
| 4,517,639 | 5/1985 | Ferrell et al. | 364/187 X |
| 4,581,701 | 4/1986 | Hess et al. | 364/187 |
| 4,583,224 | 4/1986 | Ishii et al. | 371/36 |
| 4,639,852 | 1/1987 | Motomiya | 364/187 X |
| 4,667,284 | 5/1987 | Asami | 371/36 X |

*Primary Examiner*—Joseph Ruggiero
*Attorney, Agent, or Firm*—Antonelli, Terry, Stout & Kraus

[57] ABSTRACT

A multiplex control system has controllers for delivering control data to at least one common controlled system, and a multiplex mode switching device which is constructed to permit the logic for selecting the control data to be changeably set therein. The mode selection logic of the multiplex mode switching device can be set and changed freely by the user so that a desired logic is obtainable for the selection of the control data from the controllers, whereby the adaptability and utility of the multiplex control system are increased.

18 Claims, 3 Drawing Sheets

MULTIPLEX CONTROL SYSTEM WITH PROGRAMMABLE LOGIC FOR CONTROLLING SIGNAL TRANSFER BETWEEN CONTROLLERS AND ONE OR MORE CONTROLLED SYSTEMS

BACKGROUND OF THE INVENTION (1) Field of the Invention

The present invention relates to a multiplex control system having a plurality of controllers. More particularly, the present invention is concerned with a multiplex control system in which an object to be controlled, i.e., a controlled system, is controlled by means of a plurality of controllers with a high degree of reiabililty.

(2) Description of the Related Art

Hitherto, multiplexed switching of a plurality of controllers, in particular programmable controllers, is conducted by means of hardware in accordance with a switching logic prepared by the manufacturer. Thus, users are not allowed to freely set or renew the switching logic.

A data transfer system for a duplex computer system, forming such a switching system, has been described in Japanese Patent Unexamined Publication No. 57-86972. This system can be realized as a duplex system having a backup control system or a triplex system incorporating a multiplex control system which operates with a 2-out-of-3 rule. In each case, however, the switching is performed by hardware arranged exclusively for this purpose so that the switching logic is fixed, i.e., the user is not allowed to freely set or alter the switching logic. For instance, in the 2-out-of-3 type system, the operation cannot be performed unless two out of three systems are safe. Thus, it has been difficult to operate the system with a single system at the time of start-up or maintenance of the whole system.

SUMMARY OF THE INVENTION

Accordingly, an object of the present invention is to provide a multiplex system including a plurality of controllers, in particular programmable controllers, having a wide adaptability or flexibility.

Another object of the present invention is to provide a multiplex control system for programmable controllers which enables the user to freely set and alter the multiplexing function in accordance with the use of the system.

Still another object of the present invention is to provide a multiplex mode switching device which enables switching of a plurality of controllers as desired.

To these ends, according to one aspect of the present invention, there is provided a multiplex control system including, a plurality of controllers for delivering control outputs for controlling at least one common controlled system; and a multiplex mode switching device for selecting one of the control data from the controllers in accordance with a mode switching logic which is changeably set therein and for delivering the selected control data to the controlled system or systems.

According to another aspect of the present invention, there is provided a multiplex mode switching device including, mode setting circuit capable of changeably setting a selection logic for selecting control data; and an output data selection device for selecting, in accordance with the selection logic set by the mode setting circuit, one out of a plurality of control data and delivering the selected control data as output data to a controlled system.

The multiplex control system according to the present invention is capable of selecting, in accordance with a switching logic which is changeable by the multiplex mode swithcing device, control data from among control data given by a plurality of controllers. The multiplex control system of the present invention can have a wide adaptability or flexiblility by virtue of the fact that users are allowed to freely adjust to a change in the switching logic.

Furthermore, since the output selection logic of the multiplex mode switching device can be freely set and altered, for example by writing, the multiplex mode switching device itself can freely perform the switching over of a plurality of controllers.

DESCRIPTION OF THE PREFERRED EMBODIMENTS

Figure 1:
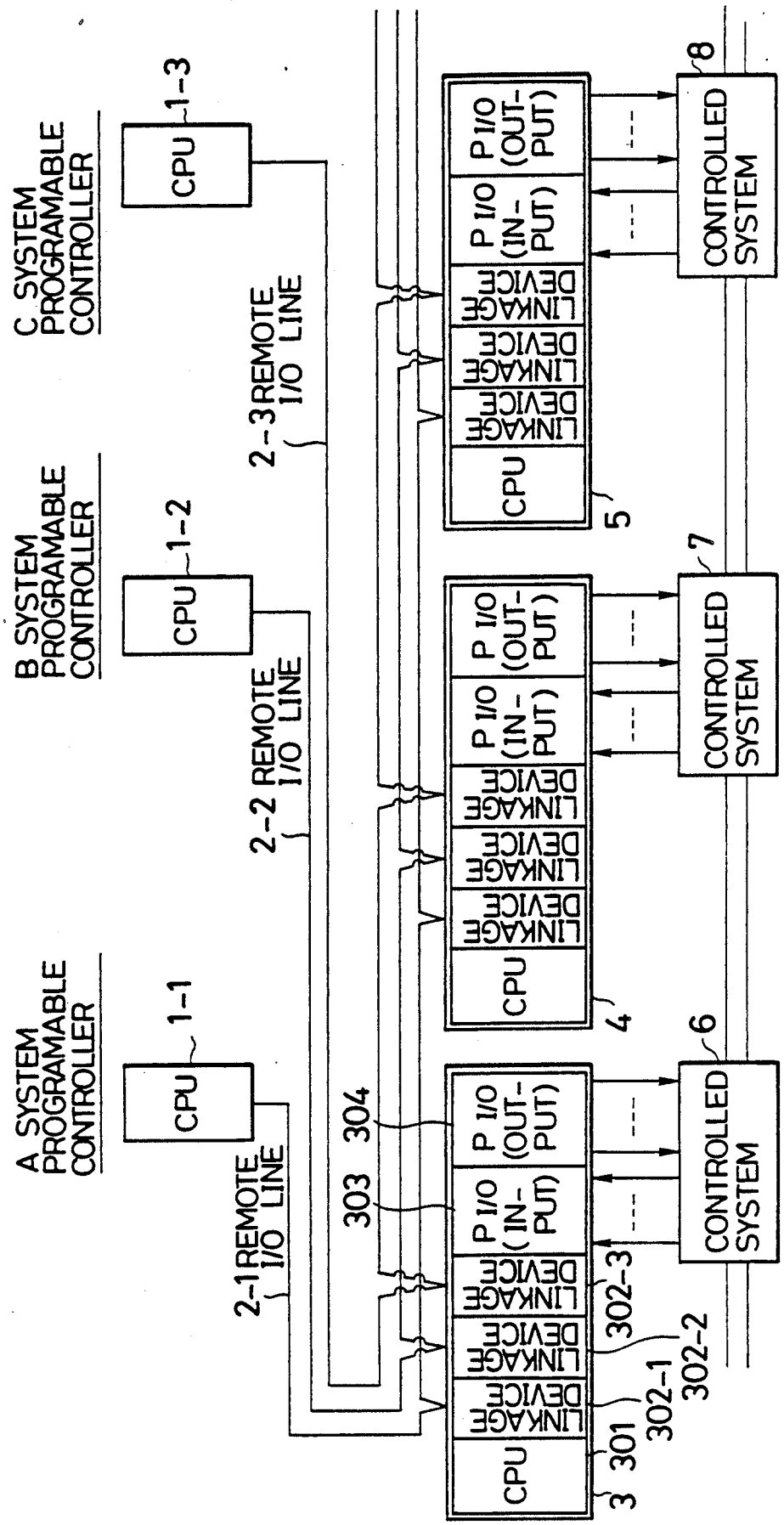
FIG. 1 is a block diagram of an embodiment of the present invention.

A preferred embodiment of the present invention will be described hereinafter with a specific reference to FIGS. 1 to 4.

A multiplex control system of the present invention is intended for a multiplex control of one or more controlled systems by means of a pluralilty of controllers, particularly programmable controllers. According to the present invention, a multiplex mode switching device or devices are provided between the controllers and the controlled system or systems, so as to enable a user to freely set or alter the control mode in accordance with the uses. A central processing unit (CPU) is used as the multiplex mode switching device. In order to connection these multiplex mode switching CPUs and the programable controllers, the multiplex mode switching devices are provided with linkage devices. The linkage device can be handled from the program of the programable controller in a manner equivalent to the handling of the PI/O (input/output processing). In addition, the linkage device has a function for temporarily storing the PI/O data. The PI/O data stored in the linkage device is output to an actual PI/O by the multiplex switching CPU in accordance with the state of switching. The logic for the switching of the mode performed by the multiplex mode switching device is programmed, written or selected by the user in view of the overall purpose or opertion of the system, in accordance with a back-up switching logic in case of a duplex system and in accordance with the 2-out-of-3 logic (majority decision rule) in case of a triplex system.

The term "controlled system" in this specification is used to means a controllable machine or devices, such as a machine tool, plant and so forth.

The program for the linkage device provided in the multiplex mode switching device is accessible from the programable controllers in the same manner as PI/O so that the program of the programable controllers can be formed in the same manner as a simplex system, i.e., without taking into account the multiplexing. The thus formed programs are loaded in a plurality of programable controllers which are connected to the linkage device of the multiplex mode switching devices.

The multiplex mode switching devices have linkage device each corresponding to a respective one of the programable controllers having input buffers. The information actually given by the PI/O is set in the input buffers of the linkage devices, and each linkage device delivers the information to the associated programable controller as desired. The output information of each programable controller is transferred to and temporarily stored in the output buffer of the linkage device, and the multiplex mode switching device delivers the output of the linkage device to the PI/O in accordance with the programmed multiplexing logic (back-up switching in case of duplex system and 2-out-of-3 switching in case of a triplex system), whereby the multiplex switching is performed.

The invention will be more fully understood from the following description of an embodiment taken in conjunction with the accompanying drawings.

FIG. 1 shows the entire portion of an embodiment of the multiplex control system of the present invention. The multiplex control system of this case is a triplex system having three programable controllers or control CPUs. The whole system is designed such that the outputs of the controllers are selected and output in accordance with a majority decision rule (2-out-of-3 logic) in which, when coincidence of the outputs from two or more control CPUs is obtained, these outputs are delivered as the control output.

This triplex control system has a system A having a CPU represented by CPU 1-1, a system b having a CPU represented by CPU 1-2 and a system C having a CPU represented by CPU 1-3. Mulitplex mode switching device 3 for switching the outputs from these three CPU is connected to these three CPUs in a manner which will be explained hereinafter. More specifically, in the illustrated embodiment, the multiplex mode switching device 3 is connected to the CPUs 1-1 to 1-3 of the systems A to C, through remote I/O lines 2-1 to 2-3 for transmitting input/output signals. The multiplex mode switching device 3 is connected also to controlled systems 6 to 8. The invention may be realized with a single controlled system, e.g., 6. In such a case, only a single multiplex mode switching device denoted by 3 is necessary. In the illustrated case, however, three controlled systems 6, 7 and 8 are employed and connected to the multiple mode switching devices 3, 4 and 5, respectively. Thus, the number of the multiplex mode switching devices can be increased as the number of the controlled systems is increased.

The multiplex mode switching device 3 includes a CPU 301 for performing logical computation for the switching of the multiplex mode, linkage devices 302-1 to 302-3 connected to the associated CPU1-1 to 1-3 through the remote I/O lines 2-1 to 2-3 for the purpose of exchange of input/output signals, PI/O 303 for receiving an input signal from the controlled system 6 and a PI/O 304 (output) for delivering an output signal from the controlled system 6. The multiplex mode switching devices 4 and 5 have the same construction.

Figure 2:
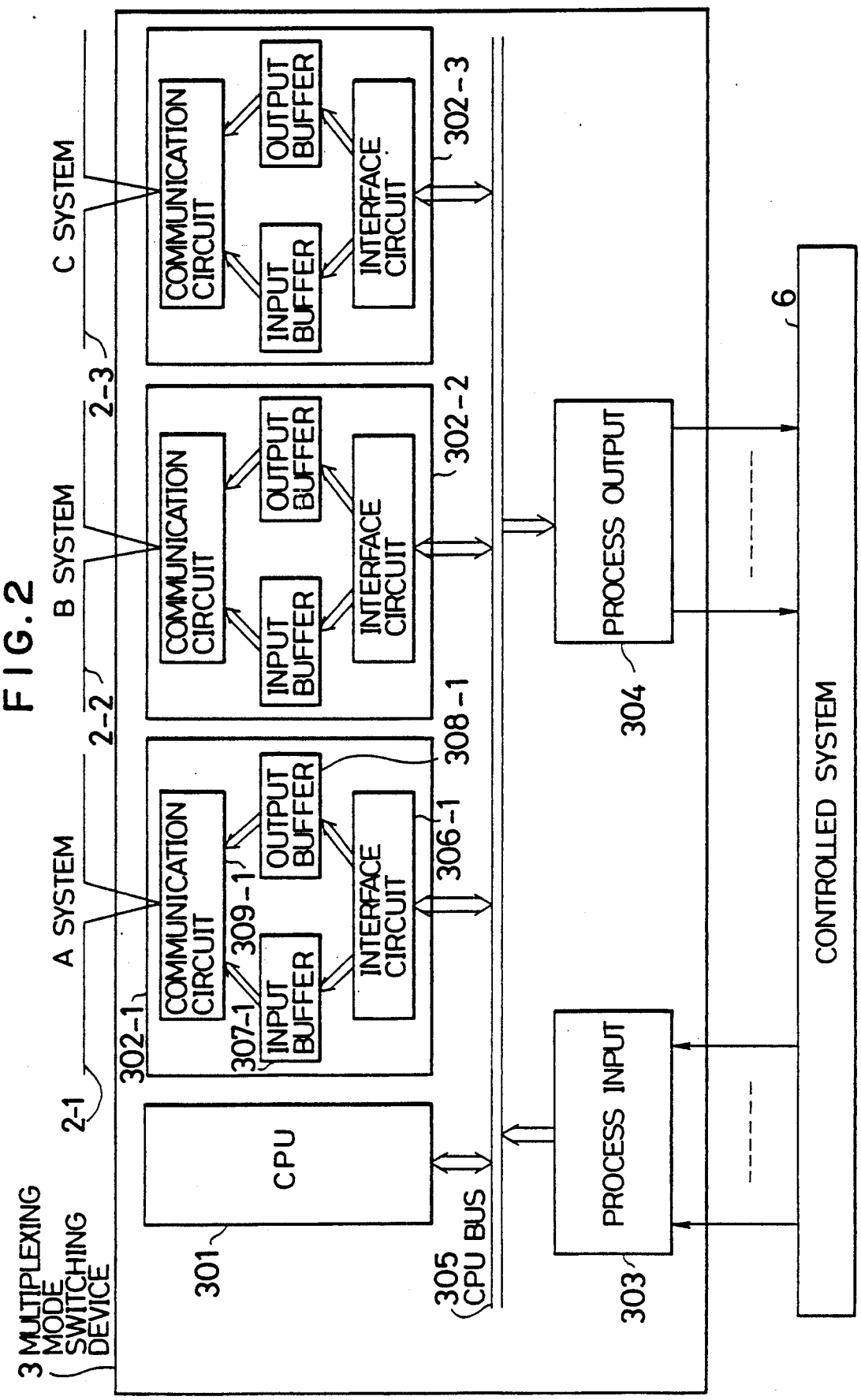
FIG. 2 is a block diagram showing the detail of the construction of a multiplex mode switching device incorporated in the embodiment shown in FIG. 1.

As will be seen from FIG. 2, the linkage device 302-1 includes a communication circuit 309-1 connected to the remote I/O line 2-1 for signal communication therethrough, an input buffer 307-1 for temporarily storing the input signal from the controlled system 6, an output buffer 308-1 for temporarily storing the output delivered by the CPU 1-1 of the system A, and an interface circuit 306-1 for delivering a signal to the input buffer 307-1 or from the output buffer 308-1. A CPU BUS 305 is used as a signal line of connecting the CPU 301 to the interface circuit 306-1.

A description will be given hereinunder of the operation of the illustrated embodiment. The CPU 301 of the multiplex mode switching device periodically picks up an input signal from the controlled system 6 through the PI/O 303 (input) at a predetermined time interval and writes the picked up signal in the input buffer 307-1 of the linkage device 302-1 for the CPU 301. The same input signal is written also in the linkage devices 302-2 and 302-3. The input signal written in the input buffer 307-1 is sent to the CPU 1-1 of the system A via the communication circuit 309-1 and the remote I/O line 2-1. Similarly, the same input signal is received by the CPUs 1-2 and 1-3 of the systems B and C via the linkage devices 302-2 and 302-3. The CPUs 1-1 to 1-3 of the systems A to C conduct control computations in accordance with the thus received input signal and the results are delivered to the linkage devices 302-1 to 302-3 tracking the same path as the input signal in a reverse manner. The output signal from the CPU 1-1 of the system A is received by the communication circuit 309-1 of the linkage device 302-1 via the remote I/O line 201 and is written in the output buffer 308-1 of this linkage device.

The CPU 301 reads the output signal from the output buffer 308-1 of the linkage device 302-1 periodically at a predetermined time interval as in the case of the input signal. The CPU 301 also reads output signals from the linkage devices 302-2 and 302-3 and compares these three output signals. The CPU then selects one of these three output signals to be supplied to the controlled sysem 6 via the PI/O 304 (output).

The comparison and selection of the three signals are executed, typically but not exclusively, in accordance with 2-out-of-3 logic in which, when two or more signals coincide with each other, such a coincident signal is delivered as the output. The description therefore will be given as to the 2-out-of-3 logic. This majority decision logic can be formed by the user as an application program of the multiplex mode switching device 3 and can be loaded in the CPU 301. An example of such a program is shown in FIG. 3.

Figure 3:
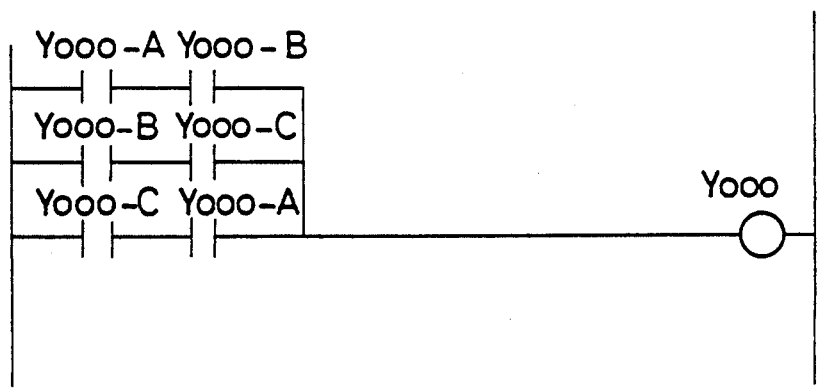
FIGS. 3 and 4 are illustrations of programs for executing a triplex switching logic.

Referring to FIG. 3, one of the outputs from the CPU1-1 of the system A is represented by $Y_{000}-A$. Corresponding outputs from the CPU 1-2 and CPU 1-3 of the systems B and C are represented by $Y_{000}-B$ and $Y_{000}-C$, respectively. The output signals are written in the linkage devices 302-1 to 302-3 for the respective signals and are read and computed by the CPU 301, the result of which is output of $Y_{0000}$ of the PI/O 304. If any two of these three signals $Y_{000}-A$ to $Y_{000}-C$ are "1", the output $Y_{000}$ is determined as "1". It is therefore possible to perform the selection in accordance with the 2-out-of-3 logic without difficulty, by picking up the thus determined output $Y_{000}$.

Figure 4:
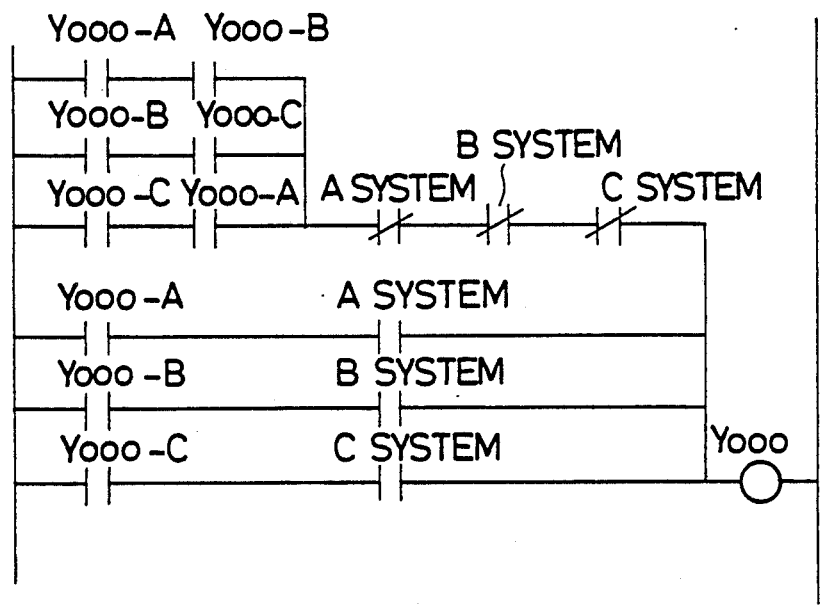

When the whole system is started up or inspected for the purpose of maintenance, it may become necessary to operate each system independently, regardless of the triplex construction relying upon the 2-out-of-3 logic. FIG. 4 illustrates an arrangement which selectively permits such an independent operation of each system. In general, starting up of the whole system can be conducted more smoothly by confirming the safe control operation of one of the three systems and then applying the same control program to the other two systems so as to enable the triplex opertion, rather than by commencing the operation in triplex mode. It is also to be understood that, when a component of one of the systems has to be renewed for the purpose of maintenance, it is necessary to operate this system alone while stopping the other systems. The switching logic program as shown in FIG. 4 is effective when such a selective change of the operation mode is necessary. In this program, when the system A alone is required to operate, the output $Y_{000}-A$ is directly output while other outputs $Y_{000}-B$ and $Y_{000}-C$ do not take part in the determination of the output $Y_{000}$.

This logic for this selection also is easily written or programmable by the user. The switching logic also may incorporate other factors for switching. For instance, the arrangement may be such that the multiplex switching device 3 gives a question to the CPUs 1-1 to 1-3 of the systems A to C and the answer such as upper and lower limits, changing rate or the like judged by the triplex mode switching C thereby judging whether the CPUs are in safe condition or not.

As has been described, according to the invention, the user is allowed to spontaneously program or select the multiplex mode switching logic so as to offer a wide adaptability of the multiplex control system, to meet demands such as multiplexing of the control system and transient system construction for maintenance, and so forth, whereby a multiplex control system having a large degree of freedom in the multiplex mode switching function can be obtained.

What is claimed is:

1. A multiplex control system for controlling at least one controlled system with a plurality of controllers, comprising:
   a plurality of controllers, each generating a respective control signal for controlling at least one controlled system, and
   a multiplex mode switching device connected to said controllers and including a plurality of buffer memories each storing a respective one of said control signals delivered from said controllers, a central processing unit operating under control of a readable and writable program memory for generating an actual control signal for actually controlling said controlled system on the basis of control signals stored in said buffer memories and in accordance with a programmed multiplex mode logic which is stored in said program memory and which is changeable by re-writing said program memory, and means for delivering said actual control signal from said central processing unit to said controlled system.

2. A multiplex control system according to claim 1, wherein said programmed multiplex mode logic includes one of a logical product of said stored control signals, a logical sum of said stored control signals and a majority decision with respect to said stored control signals.

3. A multiplex control system for controlling at least one controlled system with a plurality of controllers, comprising:
   a plurality of controllers, each generating a respective control signal for controlling at least one controlled system; and
   a multiplex mode switching device connected to said controllers and including a plurality of buffer memories each storing a respective one of said control signals delivered from said controllers, a central processing unit operating under control of a readable and writable program memory for generating an actual control signal for actually controlling said controlled system on the basis of control signals stored in said buffer memories and in accordance with a programmed multiplex mode logic selected from a plurality of programmed multiplex mode logic stored in said program memory, and means for delivering said actual control signal from said central processing unit to said controlled system.

4. A multiplex control system according to claim 3, wherein said plurality of programmed multiplex mode logic include a logical product of said stored control signals, a logical sum of said stored control signals and a majority decision with respect to said stored control signals; and
   said central processing unit including means reading out a selected one of said programmed multiplex mode logic from said program memory to generate said actual control signal in accordance with inputted information.

5. A multiplex control system for controlling at least one controlled system with a plurality of controllers, comprising:
   a plurality of programmable controllers each having a central processing unit and operating to perform control computations, in accordance with a preset program and on the basis of input data which represents the state of said controlled system, to generate a control signal for controlling said at least one controlled system; and
   a multiplex mode switching device including a plurality of buffer memories each storing a respective one of said control signals delivered from said controllers, a central processing unit operating under control of a readable and writable program memory for generating an actual control signal for actually controlling said controlled system on the basis of stored control signals in said buffer memories and in accordance with a programmed multiplex mode logic which is stored in said program memory and which is changeable by re-writing said program memory, and means for delivering said actual control signal to said controlled system.

6. A multiplex control system according to claim 5, wherein said programmed multiplex mode logic includes one of a logical product of said stored control signals, a logical sum of said stored control signals and a majority decision with respect to said stored control signals.

7. A multiplex control system for controlling at least one controlled system with a pluralilty of controllers, comprising:
   a plurality of programmable controllers each having a central processing unit and operating to perform control computations, in accordance with a preset program and on the basis of input data which represents the state of said controlled system, to generate a control signal for controlling said at least one controlled system; and
   a multiplex mode switching device including a plurality of buffer memories each storing a respective one of said control signals delivered from said controllers, a central processing unit operating under control of a readable and writable program memory for generating an actual control signal for actually controlling said controlled system on the basis of stored control signals in said buffer memories and in accordance with a programmed multiplex mode logic selected from a plurality of programmed multiplex mode logic stored in said program memory, and means for delivering said actual control signal to said controlled system.

8. A multiplex control system according to claim 7, wherein said pluralilty of programmed multiplex mode logic include a logical product of said stored control signals, a logical sum of said stored control signals and a majority decision with respect to said stored control signals; and said central processing unit including means for reading out a selected one of said programmed multiplex mode logic from said program memory to generate said actual control signal in accordance with inputted information.

9. A multiplex control system for controlling at least one control system with a plurality of controller, comprising;

a plurality of programmable controllers each having a central processing unit and operating to perform control computations, in accordance with a preset program and on the basis of input data which represents the state of said controlled system, to generate a control signal for controlling said at least one controlled system; and a multiplex mode switching device including:

(a) a plurality of linkage devices each corresponding to a respective one of said programmable controllers and having a communication portion for communicating with the corresponding controller through a communication line, a buffer memory for temporarily storing said control signal and a buffer memory for temporarily storing said input data;

(b) a central processing unit, having a program memory, for generating an actual control signal for actually controlling said controlled system on the basis of control signals stored in said buffer memories and in accordance with programmed multiplex mode logic which is stored in said program memory and which is changeable by re-writing said program memory; and (c) a process-input/output section for delivering said actual control signal from said central processing unit to said controlled system, and enabling said input data to be stored in a buffer memory of said linkage devices.

10. A multiplex control system according to claim 9, wherein said programmed multiplex mode logic includes one of a logical product of said stored control signals, a logical sum of said stored control signals and a majority decision with respect to said stored control signals.

11. A multiplex control system for controlling at least one controlled system with a plurality of controllers, comprising:

a plurality of programmable controllers each having a central processing unit and operating to perform control computations, in accordance with a preset program and on the basis of input data which represents the state of said controlled system, to generate a control signal for controlling said at least one controlled system; and a multiplex mode switching device including:

(a) a plurality of linkage devices each corresponding to a respective one of said programmable controllers and each having a communication portion for communicating with the corresponding controller through a communication line, a buffer memory for temporarily storing said control signal, and a buffer memory for temporarily storing said input data;

(b) a central processing unit, having a program memory, for generating an actual control signal for actually controlling said controlled system on the basis of control signals stored in said buffer memories in accordance with a programmed multiplex mode logic selected from a plurality of programmed multiplex logic stored in said program memory; and (c) a process-input/output section for delivering said actual control signal from said central processing unit to said controlled system, and enabling said input data to be stored in a buffer memory of said linkage devices.

12. A multiplex control system according to claim 11, wherein said plurality of programmed multiplex mode logic include a logical product of said stored control signals, a logical sum of said stored control signals and a majority decision with respect to said stored control signals; and said central processing unit includes means for reading out a selected one of programmed multiplex mode logic from said program memory to generate said actual control signal in accordance with inputted information.

13. A multiplex control system for controlling at least one controlled system with a plurality of controllers, comprising:

a multiplex mode switching device including a plurality of buffer memories each of storing a respective control signal for controlling said at least one controlled system, a central processing unit operating under control of a readable and writable program memory for generating an actual control signal for actually controlling said controlled system on the basis of control signals stored in said buffer memories and in accordance with a programmed multiplex mode logic which is stored in said program memory and which is changeable by re-writing said program memory, and means for delivering said actual control signal to said controlled system; and a plurality of controllers capable of controlling said controlled system through said multiplex mode switchding device.

14. A multiplex mode switching device comprising:

a plurality of buffer memories each storing a control signal for controlling at least one controlled system;

a central processing unit, having a program memory, for generating an actual control signal for actually controlling said controlled system on the basis of the control signals for controlling said controlled system stored in said buffer memories in accordance with a programmed multiplex mode logic which is stored in said program memory and which is changeable by rewriting said program memory; and a process-output means for delivering said actual control signal to said controlled system.

15. A multiplex mode switching device comprising:

a plurality of data communication means connectable respectively to a plurality of programmable controllers for controlling at least one controlled system;

a plurality of buffer memories each temporarily storing a respective control signal delivered from said programmable controllers through said data communication;

a central processing unit, having a program memory, for generating an actual control signal for actually controlling said controlled system on the basis of control signals stored in said buffer memories and in accordance with a programmed multiplex mode logic which is stored in said program memory and which is changeable by re-writing said program memory; and a process-output means for delivering said actual control signal to said controlled system.

16. A multiplex mode switching device according to claim 15, wherein said programmed multiplex mode logic includes ones of a logical product of said stored control signals, a logical sum of said stored control signals and a majority decision with respect to said stored control signals.

17. A multiplex mode switching device comprising:

a plurality of data communication means connectable respectively to a plurality of programmable controllers for controlling at least one controlled system;

a plurality of buffer memories each temporarily storing a respective control signal delivered from said programmable controllers through said data communication means;

a central processing unit, having a program memory, for generating an actual control signal for actually controlling said controlled system on the basis of control signals stored in said buffer memories and in accordance with a programmed multiplex mode logic selected from a plurality of programmed multiplex mode logic stored in said program memory; and a process-output means for delivering said actual control signal to said controlled system.

18. A multiplex mode switching device according to claim 17, wherein said plurality of programmed multiplex mode logic include a logical product of said stored control signals, a logical sum of said stored control signals and a majority decision with respect to said stored control signals; and said central processing unit includes means for reading out a selected one of said programmed multiplex mode logic from said program memory to generate said actual control signal in accordance with inputted information.

* * * * *